Oct. 15, 1963 K. STREICHER 3,106,749
METHOD AND MACHINE FOR THE PRODUCTION OF
CLOSURE ELEMENTS FOR SLIDE FASTENERS
Original Filed Feb. 19, 1959 6 Sheets-Sheet 1

INVENTOR.
KURT STREICHER
BY R. E. Meech
ATTORNEY

Oct. 15, 1963     K. STREICHER     3,106,749
METHOD AND MACHINE FOR THE PRODUCTION OF
CLOSURE ELEMENTS FOR SLIDE FASTENERS
Original Filed Feb. 19, 1959     6 Sheets-Sheet 2

INVENTOR.
KURT STREICHER
BY
R. E. Meech
ATTORNEY

Oct. 15, 1963

K. STREICHER 3,106,749

METHOD AND MACHINE FOR THE PRODUCTION OF
CLOSURE ELEMENTS FOR SLIDE FASTENERS

Original Filed Feb. 19, 1959

INVENTOR.
KURT STREICHER
BY R. E. Meech
ATTORNEY

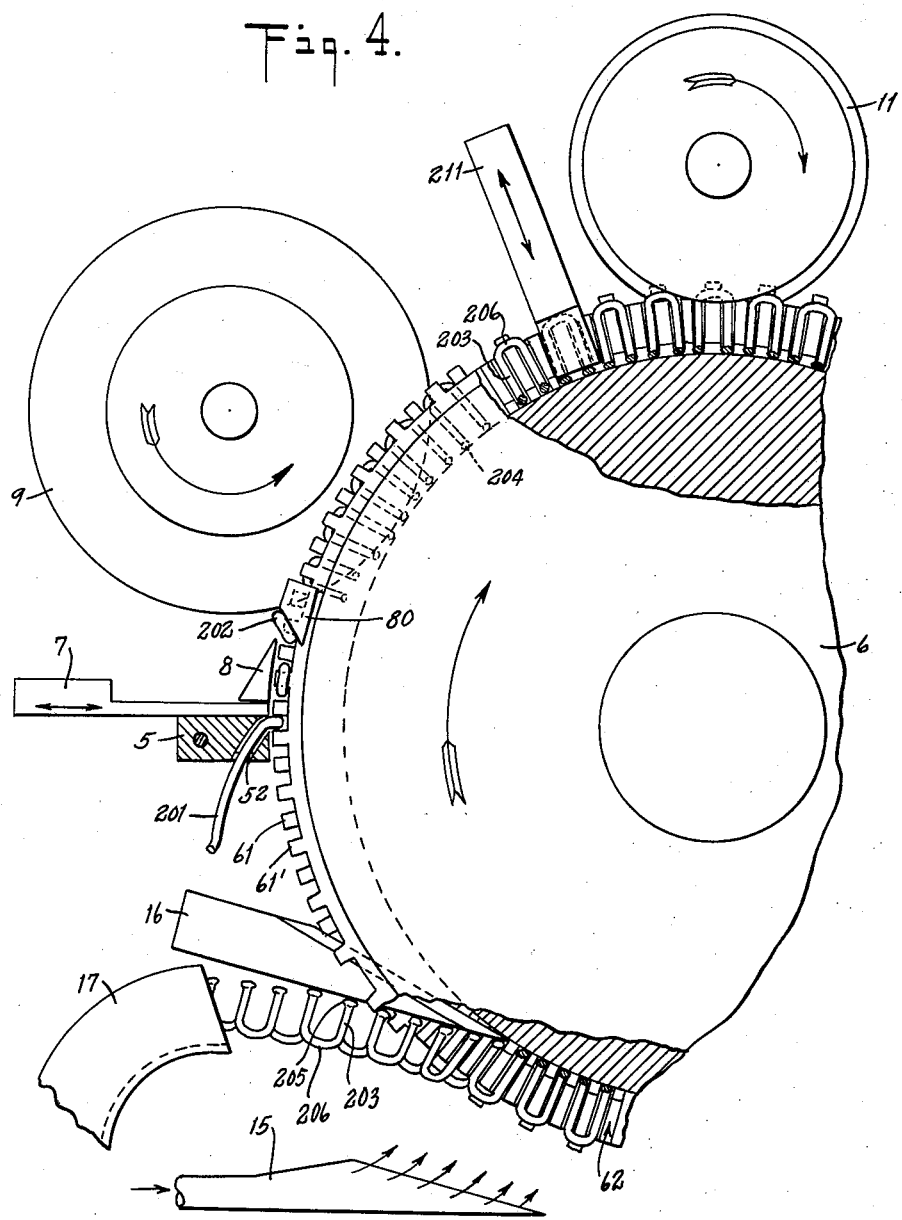

Oct. 15, 1963  K. STREICHER  3,106,749
METHOD AND MACHINE FOR THE PRODUCTION OF
CLOSURE ELEMENTS FOR SLIDE FASTENERS
Original Filed Feb. 19, 1959  6 Sheets-Sheet 5

INVENTOR.
KURT STREICHER
BY R. E. Meech
ATTORNEYS.

Oct. 15, 1963     K. STREICHER     3,106,749
METHOD AND MACHINE FOR THE PRODUCTION OF
CLOSURE ELEMENTS FOR SLIDE FASTENERS
Original Filed Feb. 19, 1959     6 Sheets-Sheet 6

INVENTOR.
KURT STREICHER
BY R. E. Meech
ATTORNEY

# United States Patent Office 3,106,749
Patented Oct. 15, 1963

3,106,749
METHOD AND MACHINE FOR THE PRODUCTION OF CLOSURE ELEMENTS FOR SLIDE FASTENERS
Kurt Streicher, Echterdingen, near Stuttgart, Germany, assignor to Talon Inc., Meadville, Pa.
Original application Feb. 19, 1959, Ser. No. 794,285, now Patent No. 3,054,149, dated Sept. 18, 1962. Divided and this application Aug. 2, 1960, Ser. No. 50,817
18 Claims. (Cl. 18—19)

The present invention relates to a machine for the production of closure elements for slide fasteners, and more particularly for the production of connected closure elements formed from a deformable elongated member preferably from plastic wire.

This application is a division of my co-pending application, Serial No. 794,285, filed February 19, 1959, which issued into Patent No. 3,054,149, September 18, 1962.

It is an object of the present invention to provide for a machine for forming an elastically deformable wire, preferably from plastic, especially a super-polyamid, e.g. nylon or perlon, into a plurality of connected closure elements for slide fasteners, which in a subsequent operation may be connected to the tape of the slide fastener by sewing, weaving, welding or cementing to thus form a slide fastener stringer of desired length.

It is an additional object of the present invention to provide for a machine for forming connected closure elements for slide fasteners which comprises relatively few and simple parts so that the machine will operate trouble-free during long time.

The machine for making such connected closure elements for slide fasteners preferably includes a forming wheel mounted on a support turnable about an axis and having at the periphery thereof two rows of radially projecting teeth, which rows of teeth being spaced from each other in axial direction, and the forming wheel being formed between the rows of teeth with an annular groove. The machine includes further winding means for winding the wire continuously from the outer face of one tooth in one row, across the space between the rows of teeth and around the outer face of the following tooth in the other row and back again across the space around the outer face of the next tooth to bend the wire into a meander-shaped configuration, and forming means for pressing the portions of the wire extending across the space between the rows of teeth into the groove between the teeth to form these portions respectively into U-shaped profiles extending in substantial radial direction of the forming wheel. The winding means are preferably in the form of a slider mounted adjacent the periphery of the forming wheel reciprocating in direction of the axis of the forming wheel. The forming means are preferably in the form of a forming disc mounted on the support turnable about an axis substantially parallel to the axis of the forming wheel and having a peripheral portion projecting into the groove of the forming wheel. The machine may also include punch means arranged behind the forming disc in direction of rotation of the forming wheel and reciprocating in radial direction of the latter between a retracted inactive position and an active position in which the free end of the punch means extends into the groove of the forming wheel and cooperates with cavities formed therein to deform the central portion of the U-shaped profiles into coupling elements for the slide fastener.

The machine may also include heating means carried by the forming wheel adjacent the groove formed therein for heating the formed wire to a temperature at about 266 degrees F. sufficient to assure a permanent deformation of the plastic wire, and cooling means for blowing a cooling medium on the heated wire just before it is stripped from the forming wheel.

The machine of the present invention includes further preferably special wire feeding means which will ensure that the wire is uniformly fed to the machine and with substantially uniform tension. Such wire feeding means preferably include at least one frusto-conical feed roll, means for holding the wire in frictional engagement with the conical surface of the feed roll, means for guiding the wire in direction transverse to the axis of the feed roll and for shifting the portion of the wire engaging the feed roll in axial direction towards the larger diameter of the feed roll when the tension on the portion of the wire leaving the roll increases and for shifting the engaged wire portion in opposite direction when the tension of the wire leaving the roll decreases.

The movable elements of the machine are preferably driven from a main shaft which is connected to the movable elements by connecting means for moving the latter. The forming wheel is preferably intermittently turned through angles substantially equal to half the pitch between the teeth in one row of said row of teeth and the winding means are reciprocated in timed relation to the intermittent motion of the forming wheel. Preferably the winding means is reciprocated while the forming wheel is at a standstill and during the intermittent motion of the forming wheel, the winding means is held stationary.

A brake, acting on the periphery of the forming wheel, is preferably provided, to prevent overriding of the forming wheel during the intermittent motion.

It is, however, also possible to drive the forming wheel with uniform circumferential speed and in this case the slider is preferably not only reciprocated in direction of the axis of the forming wheel, but also in a direction normal thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a partially sectioned side view of some of the members shown in FIG. 2, drawn to an enlarged scale;

Figure 1:
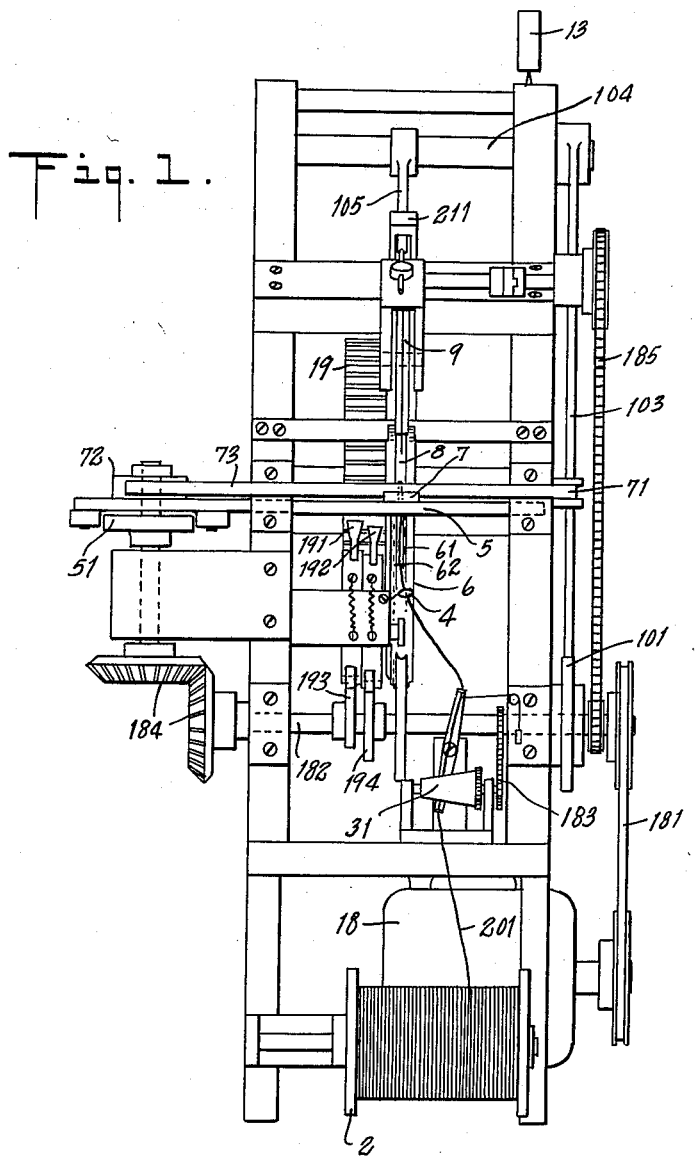
FIG. 1 is a front view of the machine of the present invention.

Referring now to the drawings, and more particularly to FIGS. 1, 2, 4 and 5 of the same, it will be seen that the machine of the present invention comprises a supporting frame 1 on which a forming wheel 6 is mounted turnable about its axis. Forming wheel 6 is provided on the periphery thereof with two rows of teeth 61, 61' preferably integrally formed with the forming wheel. The rows of teeth 61, 61' being spaced from each other in axial direction and an annular groove 62 extending inwardly from the periphery of the forming wheel is formed between the two rows of teeth. The teeth in each row of teeth are spaced equally from each other in circumferential direction and the teeth of one row are offset in relation to the teeth in the other row in circumferential direction. The forming wheel 6 is preferably formed from two substantially identical halves connected to each other along abutting side faces thereof in any known manner such, as for instance by welding or bolting. Each of the side faces being formed inwardly of the groove 62 with an annular indentation forming together an annular channel 66'. Projecting from opposite side faces of the groove 62 and extending in radial direction therealong are a plurality of spaced projections or ribs 65 to form on these side faces a plurality of spaced indentations or grooves 63 for the purpose as will later be described in detail.

Figure 4B:
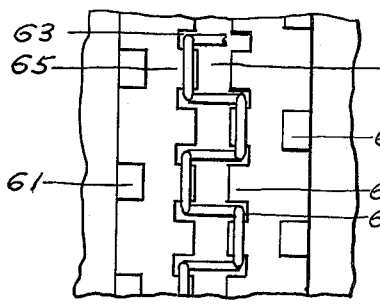
FIG. 4B is a fragmentary view of a portion of the periphery of the forming wheel showing the second step of forming the filament or wire thereon.
Figure 4A:
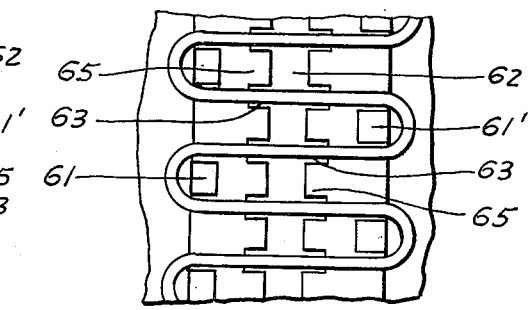
FIG. 4A is a fragmentary view of a portion of the periphery of the forming wheel showing the initial step of positioning and forming the filament or wire thereon.
Figure 8:
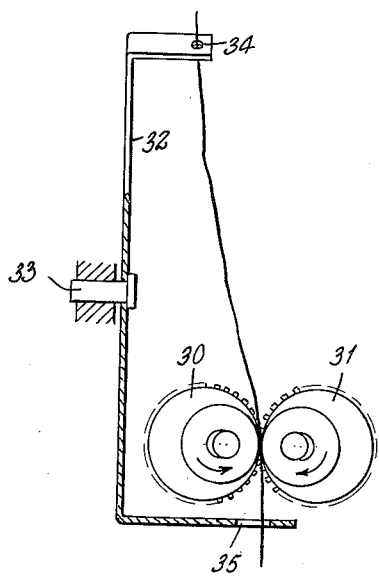
FIG. 8 is a side view of the wire feeding means of the present machine, partially in section.

The wire 201, preferably made from plastic, which is to be formed in the machine is taken from a spool 2 and transported by means of feed rollers 30 and 31 through an ear 4 to the winding means 5. The winding means 5 are preferably in the form of a slider which is intermittently reciprocated in direction of the axis of the forming wheel 6 so that the wire 201 fed through a bore 52 in the slider 5, as shown in FIG. 4, is wound during reciprocation of the slider 5 and during turning of the forming wheel 6 from the outer face of one tooth in one row of teeth across the space between the rows of teeth and around the outer face of the following tooth in the other row of teeth and back again across the space around the outer face of the next tooth in the first row of teeth so that the wire is bent into a meander-shaped configuration. The slider is guided during its reciprocation in the machine frame 1 and driven by a cam 51 as will be described later on in detail. Cooperating with the slider 5 is a pusher member 7 which is reciprocated in a direction transverse to the axis of the forming wheel 6 by means of a lever 73, pivotally mounted at the end 71 on the machine frame and engaged at the other end thereof by a cam or eccentric 72, which in turn is driven as will be explained later on in detail. The pusher member 7 serves to push the wire 201 into the space between the teeth 61, 61'. A stationary member 8 fixedly mounted on the frame serves to guide the pusher member 7 during its reciprocation and at the same time the member 8 maintains the wire 201 wound about the teeth. The thus formed wire loops are then lifted from the teeth 61, 61' in axial direction by a pair of stationary wedge-shaped members or lifting means 80 which are respectively fixedly mounted on the machine frame and arranged on opposite sides of the periphery of the forming wheel 6, as best shown in FIG. 4, in which only one of the members 80 is illustrated.

A forming disc 9 turnably mounted on the frame 1 for rotation about an axis parallel to the axis of the forming wheel 6, and in a direction opposite to the direction this forming wheel rotates, engages the transverse portions 202 of the bent wire to press these transverse portions in the annular groove 62 formed between the rows of teeth in the forming wheel 6, so that the portions 202 are formed into substantial U-shaped configuration, whereby the legs of the U-profiles become respectively located in the radial directed indentations 63 formed between the projections 65 in the groove 62.

Figure 3:
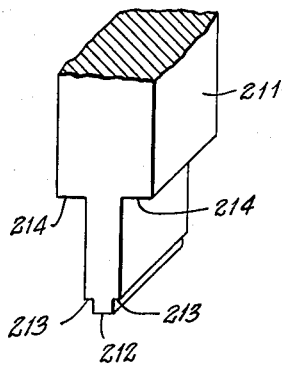
FIG. 3 is a partial perspective view of the punch means of the machine.

Following the forming disc 9 in direction of rotation of the forming wheel 6 are punch means 211, which are mounted on the frame 1 for reciprocation in radial direction of the forming wheel 6 between a retracted inactive position and an active position in which the end face 212 of the punch 211 engages portions 204 of the formed wire which extend across the bottom of the groove 62 to flatten these portions and to form these portions into coupling elements 205. To give the coupling elements 205 a desired shape the bottom face of the groove 62 may be provided with small cavities into which the wire portions 204 are then pressed by the bottom face 212 of the punch. To limit the inward movement of the punch 211, the punch is provided adjacent the bottom end thereof with shoulders 213 projecting laterally from the punch which will abut at the innermost position of the punch against shoulders 64 projecting inwardly from the ribs or projections 65 in the groove 62. The punch 211 has further shoulders 214, as best shown in FIG. 3, which will act at the innermost position of the punch against the bent portions 206 of the wire resting on the top face of the projections 65, to produce in this way an equalization and setting of the bent wire portions 206.

Figure 6:
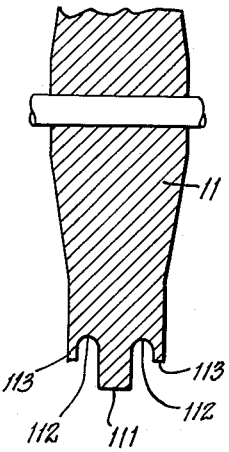
FIG. 6 is a partial cross section through the forming disc cooperating with the forming wheel.
Figure 5:
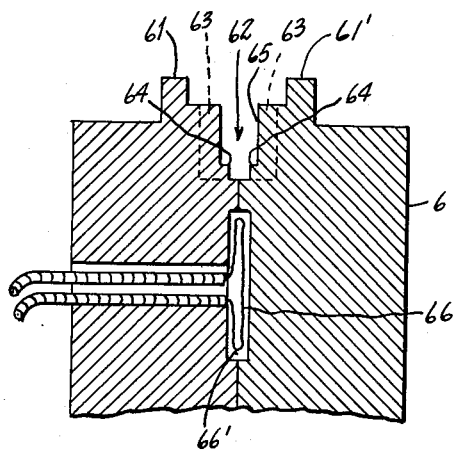
FIG. 5 is a cross section taken through the peripheral portion of the forming wheel shown in FIGS. 2 and 4.

In order to equalize any irregularities, for instance in the length of the legs 203 of the bent wire, and to remove any fins on the bent portion 206 of the wire, which may occur during the lifting of the bent wire from the teeth 61, 61', an additional forming disc 11 is provided which is mounted for rotation about an axis parallel to the axis of the forming wheel 6 adjacent the punch means 211 and following this punch means in direction of rotation of the forming wheel. The additional forming disc 11 has a cross section as best shown in FIG. 6 and the annular rim 111 of this disc of substantially rectangular cross section engages in the annular groove 62 of the forming wheel 6. The two semi-circular grooves 112 located laterally of the rim portion 111 will engage the bent portion 206 of the wire and equalize any existing difference in the length of the legs 203. The two outer rim portions 113 of the forming disc 11, on the other hand, serve to remove any fins extending outwardly from the bent portions 206 or to press such fins onto these portions.

Located in contact with the outer periphery of the forming wheel 6 and opposite from the slider 5 is a thermometer means 12 which is operatively connected in any known way to a thermostat 13, which in turn controls the current supply to a heating spiral 66 located in the annular channel 66' formed in the forming wheel 6 so as to heat the forming wheel 6 to a desired temperature. The heating spiral 66 is connected to a source of electric energy in any known, not illustrated manner, for instance over a pair of brushes and collector rings so that the forming wheel 6 may be rotated while current is supplied to the heating spiral 66.

There is located at the bottom of the forming wheel 6 below the thermo means 12, preferably a friction shoe brake 14 which contacts the outer periphery of the forming wheel so as to prevent over riding thereof during the intermittent movement of this wheel.

Nozzle means 15 are provided for blowing a cooling medium, for instance cold air, against the finished formed wire shortly before it is stripped from the forming wheel 6. A wedge-shaped stripper 16 fixedly mounted on frame 1, best shown in FIG. 4, engages the finished formed wire at the innermost portions thereof to strip the finished formed wire from the forming wheel 6 and the formed wire enters then in a chute 17 mounted on the frame 1.

The drive of the machine elements is derived from a motor 18 which drives over a belt drive 181 the main shaft 182 of the machine, from which over a pair of gears 183 the feed roll 30 of the wire feed means are driven. A belt drive may also be used for driving the feed roll 30, in which case a pulley 133 (FIG. 9) is mounted on the shaft of roll 30, which is driven over a belt from the main shaft 182.

Figure 9:
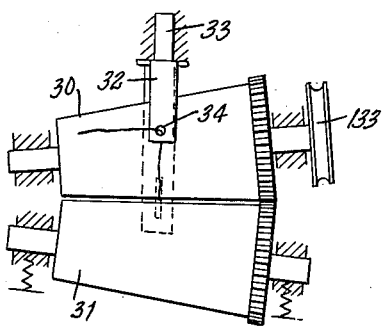
FIG. 9 is a top view of this wire feeding means.

The wire feed means, which regulate the feeding of the wire 201 from the spool 2 to the slider 5, include the driven feed roll 30 and an additional feed roll 31 which is spring-loaded, as best shown in FIG. 9, to press the wire 201 into frictional engagement with the surface of the driven feed roll 30. The two feed rolls may have at one end thereof engaging gears so that the feed roll 31 is driven by the feed roll 30. The two feed rolls 30 and 31 have, as best shown in FIG. 9, a frusto-conical configuration. The wire feeding means include further wire guiding and shifting means including an elongated lever 32 extending in a direction transverse to the axis of the feed roll 30 and being mounted intermediate the ends thereof tiltable about an axis 33. The lever 32 has at opposite ends 34 and 35 thereof annular portions or eyes through which the wire 201 is guided. The upper end 34 of lever 32 is located between the feed roll 30 and the guide ear 4 fixed on the frame 1, whereas the lower end 35 of the lever extends beyond the side of the feed roll 30 distant from the ear 4.

Figure 10:
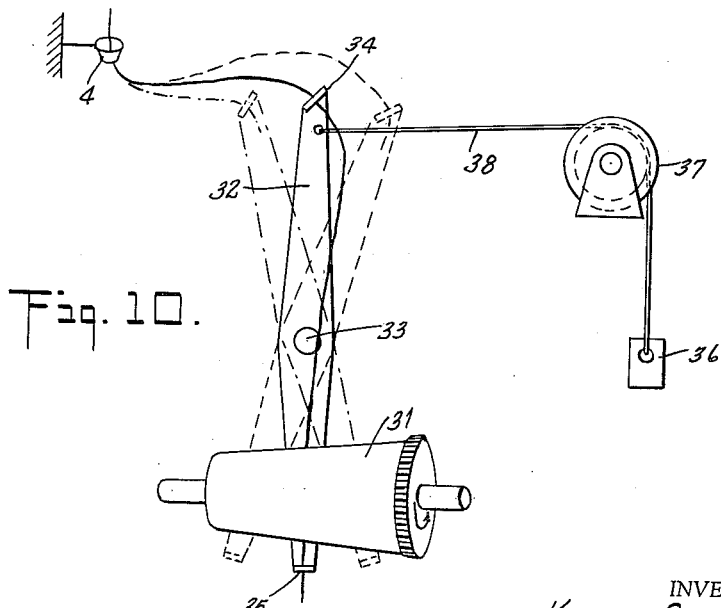
FIG. 10 is a front view of this wire feeding means.

The wire guiding and shifting means will operate as follows:

If the feed rolls 30, 31 do not feed sufficient wire, the wire portion between the ear 4 and the pair of feed rolls will be tensioned so that the upper end 34 of the lever 32 will be pulled in direction toward the left, as viewed in FIG. 10 to the position shown in dash-dotted lines, whereby the lower end 35 of this lever will move the wire portion engaged thereby towards the large diameter of the frusto-conical feed rolls 30, 31. The wire feed is thereby increased so that the tension on the wire will be reduced and the lever 32 will return to its normal position shown in full lines in FIG. 10 under the influence of the pulling force of a weight 36 connected by a rope 38 guided over a pulley 37 to the upper end 34 of the lever 32. If, on the other hand, the feed rolls 30, 31 feed more wire than is taken up by the rotating forming wheel 9, a slack will develop in the wire portion located between the feed rolls and the ear 4 and the weight 36 will therefore shift the lever 32 to the position shown in dotted lines in FIG. 10 so that the portion of the wire engaged between the feed rolls 30 and 31 will be shifted towards the small diameter end of the frusto-conical feed rolls end so that the wire feed will be reduced.

The slider 5 is reciprocated by means of a cam 51, engaging two cam followers located on opposite sides of the cam 51 as shown in FIG. 1. The cam 51 is driven from the main shaft 182 of the machine over a pair of bevel gears 184. Cam 72 is mounted on the same shaft as cam 51 and is also driven thereby.

Figure 2:
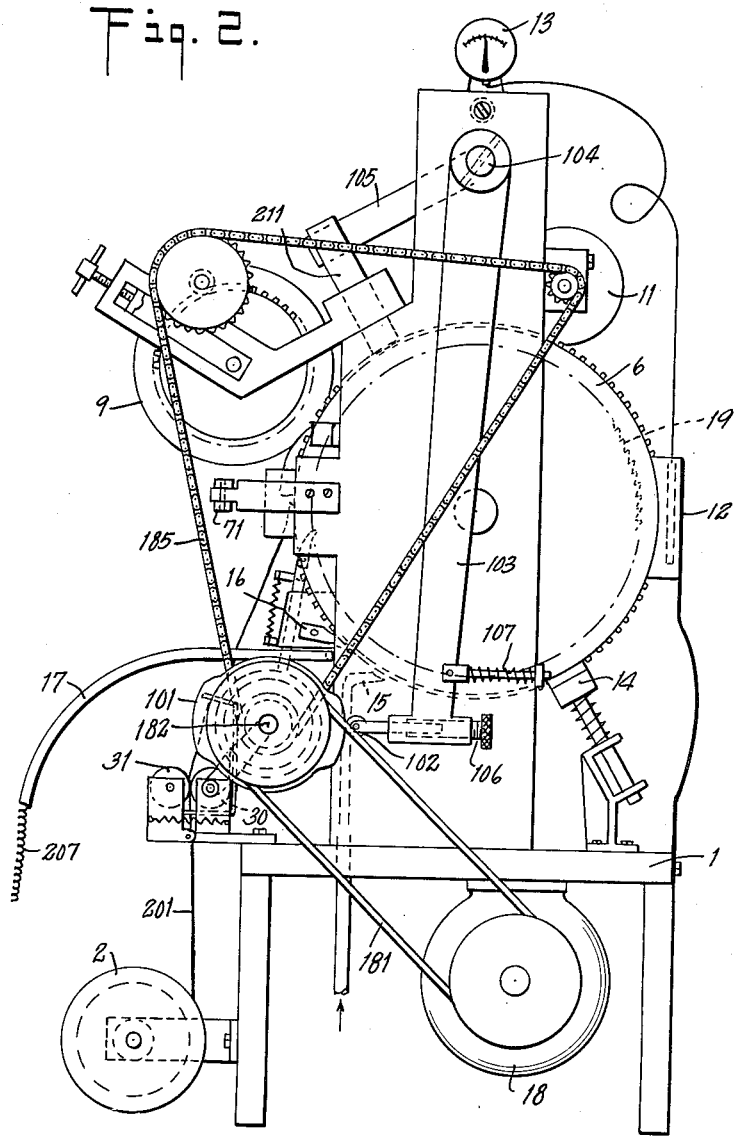
FIG. 2 is a side view of this machine.

The forming discs 9 and 11 are also driven from the main shaft 182, preferably over a chain drive 185 which is guided over appropriate chain gears as best shown in FIG. 2. As shown in FIG. 2, a chain gear is mounted on the shaft 182 which drives the forming disc 11 by means of the chain 185 and a chain gear coaxially mounted and fixed to the forming disc 11, whereas the forming disc 9 is preferably driven over a chain gear driven by the chain 185 and carrying coaxially a small pinion meshing with a larger gear fixed coaxially with the axis of the disc 9 to this disc.

Figure 7:
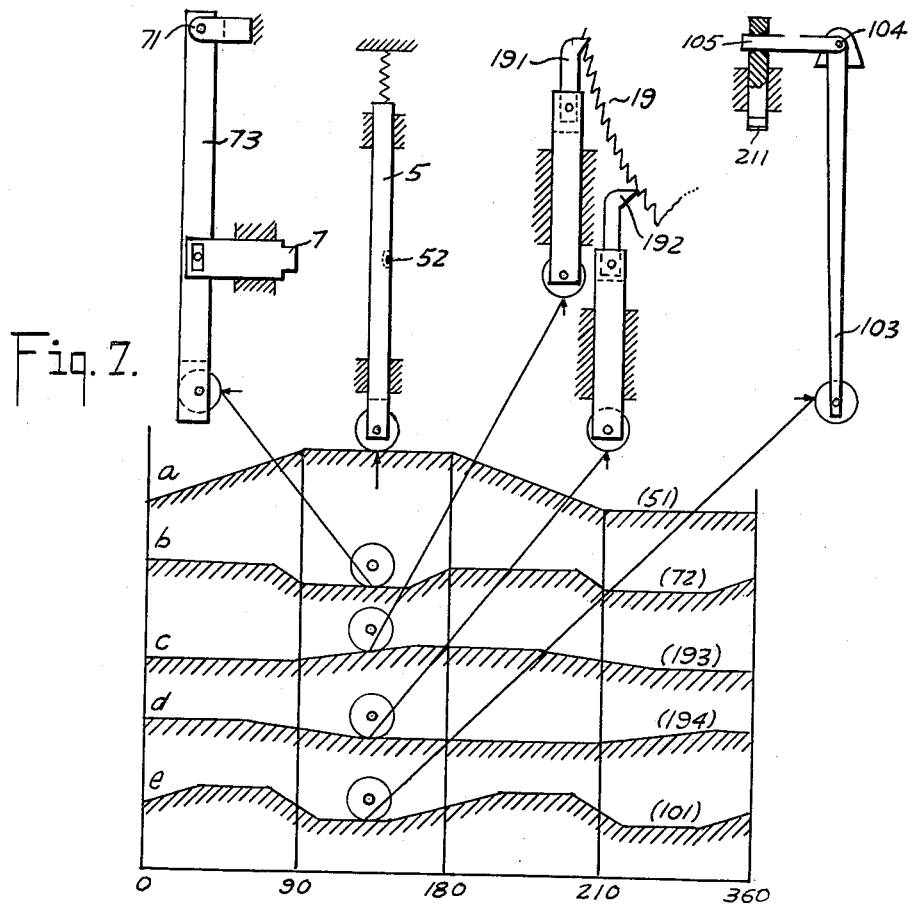
FIG. 7 is a schematic view illustrating the cams for moving various elements of the machine in developed form and indicating the position of these elements on these cams at a given movement of the machine operation.

The reciprocating movement of the punch means 211 is also derived from the main shaft 182 of the machine. For this purpose a cam 101 is fixed to the shaft 182 for rotation therewith and the peripheral cam face of the cam 101 is engaged by a cam follower roller 102 carried adjacent one end of a lever 103 mounted on the other end thereof on a shaft 104 for tilting movement about the shaft axis. Connected to the shaft 104 is a lever 105 for tilting movement therewith, extending inclined to the lever 103 as best shown in FIG. 2. The free end of the lever 105 engages in an opening formed adjacent the upper end of the punch 211 and the engaging faces of the punch 211 are preferably curved as shown in FIGS. 2 and 7. The punch 211 is guided adjacent the lower end thereof in an appropriate member of the frame 1 for reciprocating motion. The distance of the roller 102 from the lower end of the lever 103 in transverse direction of this lever may be adjusted by an adjusting screw 106 screwed in a sleeve formed at the lower end of the lever 103. By adjusting the distance of the roller 102 from the lower end of the lever 103 the stroke of the punch may be slightly adjusted. The lever 103 is under the influence of a compression spring 107 which presses the roller 102 against the periphery of the cam 101.

The forming wheel 6 is preferably intermittently turned and for this purpose a ratchet gear 19 is coaxially arranged with the forming wheel 6 and fixedly connected thereto. Engaging the teeth of the ratchet wheel are two feed dogs 191, 192 which in turn are controlled by two cams 193 and 194 fixedly mounted on the main shaft 182 of the machine for rotation therewith. The teeth of the ratchet wheel 19 are preferably spaced from each other a pitch equal to the pitch of the teeth of one row of the teeth on the forming wheel so as to make the teeth of the ratchet wheel as strong as possible and the dogs 191, 192 are reciprocated by the cams 193 and 195 in such a way that the ratchet wheel is moved during reciprocation of each dog for half a pitch.

FIG. 7 shows schematically the various cams of the machines in developed form in connection with the element controlled by the respective cam. The line $a$ corresponds to the cam 51 which controls the slider 5 with the guide opening 52. Line $b$ corresponds to the cam 72 which controsl the movement of the pusher member 73. The two lines $c$ and $d$ correspond to the cams 193 and 194 which operate the dogs 191 and 192, respectively, and finally the line $e$ corresponds to the cam 101, which controls the movement of the lever arrangement for operating the punch 211.

The position of the cam followers of the various elements indicated in FIG. 7 corresponds to a position of the machine in which the slider 5 is in one of its end positions, in which the pusher member 7 has pushed the wire in the space between two teeth on the forming wheel 6, in which the dog 191 is moved to perform the turning of the ratchet wheel 19 and therewith the forming wheel connecting thereto, whereas the other dog 192 is in rest position, and the punch 211 will be held in its retracted inactive position. From the schematic showing of the developed cam surface of the various cams fixedly mounted on the main shaft 182 of the machine, it will be evident that the reciprocating members of the machine will be moved in proper timed relationship to the intermittent motion of the forming wheel 6.

If the machine is built for the formation of stronger closure elements which are spaced further apart than shown in the figures of the drawing, it is possible to provide only a single feed dog for the intermittent rotation of the ratchet wheel 19 since the pitch of the teeth thereof can in this case be sufficiently great to make the teeth strong enough to prevent breaking or premature wear of the same.

In this case a single cam is provided instead of the two cams 193 and 194 and the development of the periphery of this cam would be similar to the developments $c$ and $d$ arranged in succession.

It will be understood that each of the elements described above, or two or more together, may also find a useful application in other types of machines for making connected closure elements for slide fasteners from a deformable continuous wire differing from the types described above.

While the invention has been illustrated and described as embodied in a machine for making connected closure elements for slide fasteners from a deformable continuous wire in which this wire is bent into a meander-shaped configuration, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being recessed radially at the periphery to form an annular groove, said groove being positioned between said rows of teeth and extending around the circumference of said forming wheel, winding means for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, and means extending into said groove for forcing the portions of the wire extending across the space between the rows of teeth into said groove so as to deform the same whereby said portions are formed respectively into U-shaped profiles extending in substantial radial direction of said forming wheel.

2. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being recessed radially at the periphery to form an annular groove, said groove being positioned between said rows of teeth and extending around the circumference of said forming wheel, the teeth in each row of teeth being equally spaced from each other in circumferential direction and offset in this direction relative to the teeth in the other row, winding means for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, and means extending into said groove for forcing the portions of the wire extending across the space between the rows of teeth into said groove so as to deform the same whereby said portions are formed respectively into U-shaped profiles extending in substantial radial direction of said forming wheel.

3. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, and drive means for turning said forming wheel and said forming disc respectively in opposite directions and for reciprocating said winding means.

4. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being space from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, and drive means for turning said forming wheel and said forming disc respectively in opposite directions and for reciprocating said winding means.

5. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, and drive means for turning said forming wheel and said forming disc respectively in opposite directions and for reciprocating said winding means and said punch means.

6. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said form wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, a second forming disc mounted on said support behind said punch means in direction of rotation of said forming wheel turnable about an axis substantially parallel to the axis of the latter, said second forming disc having a peripheral portion extending into said groove and said forming disc having at the periphery thereof a profile matching in cross section in a plane through its axis substantially the profile of said bent wire portions, and drive means for turning said forming wheel and forming discs and for reciprocating said winding means and said punch means.

7. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said form wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, a second forming disc mounted on said support behind said punch means in direction of rotation of said forming wheel turnable about an axis substantially parallel to the axis of the latter, said second forming disc having a peripheral portion extending into said groove and said forming disc having at the periphery thereof a profile matching in cross section in a plane through its axis substantially the profile of said bent wire portions, stripping means for stripping the finished formed wire out of said groove, and drive means for turning said forming wheel and said forming discs and for reciprocating said winding means and said punch means.

8. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, a plurality of spaced projections extending in radial direction along opposite side faces of said groove and projecting therefrom partly into said groove to form on said side faces a plurality of spaced indentations adapted to receive the legs of the U-shaped profiles, respectively; lifting means arranged between said winding means and said forming disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, a second forming disc mounted on said support behind said punch means in direction of rotation of said forming wheel turnable about an axis substantially parallel to the axis of the latter, said second forming disc having a peripheral portion extending into said groove and said forming disc having at the periphery thereof a profile matching in cross section in a plane through its axis substantially the profile of said bent wire portions; stripping means for stripping the finished formed wire out of said groove, and drive means for turning said forming wheel and said forming discs and for reciprocating said winding means and said punch means.

9. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, a plurality of spaced projections extending in radial direction along opposite side faces of said groove and projecting therefrom partly into said groove to form on said side faces a plurality of spaced indentations adapted to receive the legs of the U-shaped profiles, respectively; lifting means arranged between said winding means and said form disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, a second forming disc mounted on said support behind said punch means in direction of rotation of said forming wheel turnable about an axis substantially parallel to the axis of the latter, said second forming disc having a peripheral portion extending into said groove and said forming disc having at the periphery thereof a profile matching in cross section in a plane through its axis substantially the profile of said bent wire portions, said punch means and said second forming disc having respectively engaging faces extending over the circumferential front faces of said projections and cooperating with the same for setting the bent wire portions by deforming the wire cross section, stripping means for stripping the finished formed wire out of said groove, and drive means for turning said forming wheel and said forming discs and for reciprocating said winding means and said punch means.

10. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being recessed radially at the periphery to form an annular groove, said groove being positioned between said rows of teeth and extending around the circumference of said forming wheel, heating means located in said forming wheel adjacent said groove formed therein; winding means for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, and means extending into said groove for forcing the portions of the wire extending across the space between the rows of teeth into said groove so as to deform the same whereby said portions are formed respectively into U-shaped profiles extending in substantial radial direction of said forming wheel.

11. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being recessed radially at the periphery to form an annular groove, said groove being positioned between said rows of teeth and extending around the circumference of said forming wheel, said forming wheel being formed from two substantially identical discs connected to each other along abutting side faces thereof, each of said side faces being formed inwardly of said groove with an annular indentation forming together an annular channel, heating means in form of a heating spiral located in said annular channel, winding means for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, and means extending into said groove for forcing the portions of the wire extending across the space between the rows of teeth into said groove so as to deform the same whereby said portions are formed respectively into U-shaped profiles extending in substantial radial direction of said forming wheel.

12. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other rows of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, punch means mounted on said support behind said forming disc in direction of rotation of said form wheel for reciprocation in radial direction of the latter between a retracted, inactive position and an active position in which the free end thereof extends into said groove and cooperates with the cavities therein to deform the central portion of the U-shaped profiles into coupling elements of the slide fastener, a second form disc mounted on said support behind said punch means in direction of rotation of said forming wheel turnable about an axis substantially parallel to the axis of the latter, said second forming disc having a peripheral portion extending into said groove and said forming disc having at the periphery thereof a profile matching in cross section in a plane through its axis substantially the profile of said bent wire portions, stripping means for stripping the finished formed wire out of said groove, heating means located in said forming wheel adjacent said groove formed therein, nozzle means located before said stripping means and adjacent the periphery of said forming wheel for blowing a cooling medium against the finished formed wire, and drive means for turning said forming wheel and said forming discs and for reciprocating said winding means and said punch means.

13. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, said groove being formed at the bottom surface thereof with spaced cavities, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, lifting means arranged between said winding means and said forming disc for lifting the bent wire in radial direction off said teeth, punch means mounted on said support behind said forming disc in direction of rotation of said forming wheel for reciprocation in radial direction of the latter between a retracted, inactive position and an active position in which the free end thereof extends into said groove and cooperates with the cavities therein to deform the central portion of the U-shaped profiles into coupling elements of the slide fastener, and drive means turning said forming wheel, said forming discs and for reciprocating said winding means and said punch means and including a main shaft and connecting means connecting said main shaft with said forming wheel, said forming discs, said winding means and said punch means for moving the same.

14. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, wire feeding means for feeding the wire to said winding means and including at least one frusto-conical feed roll, means for holding the wire in frictional engagement with the conical surface of said feed roll, and means for guiding the wire in direction transverse to the axis of said feed roll and for shifting the portion of the wire engaging the feed roll in axial direction towards the larger diameter of the feed roll when the tension on the portion of the wire leaving the roll increases and for shifting the engaged wire portion in opposite direction when the tension on the wire leaving the roll decreases, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, and drive means for turning said forming wheel and said forming disc respectively in opposite directions and for reciprocating said winding means.

15. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, wire feeding means for feeding the wire to said winding means and including at least one frusto-conical feed roll, means for holding the wire in frictional engagement with the conical surface of said feed roll, and means for guiding the wire in direction transverse to the axis of said feed roll and for shifting the portion of the wire engaging the feed roll in axial direction towards the larger diameter of the feed roll when the tension on the portion of the wire leaving the roll increases and for shifting the engaged wire portion in opposite direction when the tension on the wire leaving the roll decreases, said wire guiding and shifting means including a lever extending in a direction transverse to the axis of said feed roll and being mounted intermediate the ends thereof tiltable about an axis, said lever having at opposite ends thereof engaging portions through which said wire is guided, one of the ends of said lever being located between said feed rolls and said winding means and the other end of said lever extending beyond the side of the feed roll distant from said winding means, and means tending to shift the other end of said lever in a direction toward the small diameter end of said feed roll, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, and drive means for turning said forming wheel and said forming disc respectively in opposite directions and for reciprocating said winding means.

16. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, and drive means for intermittently turning said forming wheel so that the periphery thereof is turned during each intermittent motion through a distance substantially equal half of the center distance of two consecutive teeth in one of said rows of teeth, for continuously turning said forming disc in a direction opposite to the direction of rotation of the forming wheel and for reciprocating said winding means in timed relation to said intermittent rotation of said forming wheel.

17. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said grove for pressing the portions of the wire extending across the space between the rows of teeth into said groove to form said portions respectively into U-shaped profiles extending in substantail radial directon of said forming wheel, and drive means for intermittently turning said forming wheel so that periphery thereof is turned during each intermittent motion through a distance substantially equal half of the center distance of two consecutive teeth in one of said rows of teeth, for continuously turning said forming disc in a direction opposite to the direction of rotation of the forming wheel and for reciprocating said winding means in timed relation to said intermittent rotation of said forming wheel, said drive means including a ratchet wheel coaxial with said forming wheel and connected thereto for simultaneous rotation, the teeth of said ratchet wheel having a pitch substantially equal to the pitch of the teeth of one row of teeth of the forming wheel, said driving means including further a pair of feed dogs engaging said teeth of said ratchet wheel, and cam means for intermittently and alternatively reciprocating said dogs for turning said ratchet wheel for half a pitch during reciprocating of each dog.

18. A machine for making connected closure elements for slide fasteners from a deformable continuous wire comprising, in combination, a support, a forming wheel mounted on said support turnable about an axis and having at the periphery thereof two rows of radially projecting teeth, said rows of teeth being spaced from each other in axial direction and said forming wheel being formed between said rows of teeth with an annular groove, the teeth in each row of teeth being equally spaced from each other in circumferential direction and offset in this direction relative to the teeth in the other row, winding means mounted on said support adjacent the periphery of said forming wheel for reciprocation in direction of the axis of said forming wheel for winding the wire continuously from the outer face of one tooth in one of said rows of teeth, across the space between the rows of teeth and around the outer face of the following tooth in the other row of teeth and back again across said space around the outer face of the next tooth to bend the wire into a meander-shaped configuration, a forming disc mounted on said support turnable about an axis substantially parallel to the axis of said forming wheel and having a peripheral portion projecting into said groove for pressing the portions of the wire extending across the space between the rows of teeth into said groove to form said portions respectively into U-shaped profiles extending in substantial radial direction of said forming wheel, drive means for intermittently turning said forming wheel so that the periphery thereof is turned during each intermittent motion through a distance substantially equal half of the center distance of two consecutive teeth in one of said rows of teeth, for continuously turning said forming disc in a direction opposite to the direction of rotation of the forming wheel and for reciprocating said winding means in timed relation to said intermittent rotation of said forming wheel, and brake means for braking the movement of said forming wheel during the intermittent motion thereof.

References Cited in the file of this patent

UNITED STATES PATENTS

| | | |
|---|---|---|
| 500,383 | Gendron | June 27, 1893 |
| 1,615,666 | Wright | Jan. 25, 1927 |
| 2,047,717 | Van Dresser et al. | July 14, 1936 |
| 2,317,530 | Holmes et al. | Apr. 27, 1943 |
| 2,591,943 | Kitselman | Apr. 8, 1952 |
| 2,849,031 | Blumensaadt | Aug. 26, 1958 |
| 2,874,731 | Smith | Feb. 24, 1959 |
| 2,903,475 | Hansen | Sept. 15, 1959 |
| 2,998,032 | Platt | Aug. 29, 1961 |